READ-ONLY MEMORY SYSTEM

Filed Jan. 19, 1965 3 Sheets-Sheet 1

Inventors
JAN VAN GOETHEM
RENÉ DE SMEDT
ANDRÉ E. A. LAUWERS
By [signature]
Attorney Inventors
JAN VAN GOETHEM
RENÉ DE SMEDT
ANDRÉ E. A. LAUWERS
By [signature]
Attorney Dec. 10, 1968 J. VAN GOETHEM ET AL 3,416,143

READ-ONLY MEMORY SYSTEM

Filed Jan. 19, 1965 3 Sheets-Sheet 3

Inventors
JAN VAN GOETHEM
RENÉ DE SMEDT
ANDRÉ E. A. LAUWERS
By Perry P. Lantz
Attorney United States Patent Office 3,416,143

Patented Dec. 10, 1968

3,416,143

READ-ONLY MEMORY SYSTEM

Jan Van Goethem and René De Smedt, Antwerp, and André Ernest Antoon Lauwers, Muizen, Belgium, assignors to International Standard Electric Corporation, New York, N.Y., a corporation of Delaware Filed Jan. 19, 1965, Ser. No. 426,585
Claims priority, application Netherlands, Jan. 24, 1964, 6400537
6 Claims. (Cl. 340—173)

ABSTRACT OF THE DISCLOSURE

The present disclosure relates to a read-only memory system including a two co-ordinate arrangement of reactive cross-point couplings, each being connected between a particular pair of electrical conductors, one conductor out of a first set of $n$ conductors and the other conductor out of a second set of $m$ conductors, input circuits via which an input or linearly increasing interrogation signal may be applied to an electrical conductor out of said first set, the output information corresponding to the interrogation of this conductor appearing in output circuits which are coupled to the electrical conductors of said second set.

Such a read-only memory system is described in the French Patent 1,245,808 (J. Van Goethem 7). Therein an electrical conductor or row wire out of $n$ conductors or row wires of the first set is coupled through reactive cross-point couplings to $m-x$ conductors or column wires of the second set ($o \leqslant x \leqslant m$). The interrogation of a particular row is performed by applying thereto, through the above said input circuits, an interrogation signal which has a sine waveform. A 1-output signal then appears at the outputs of the $m-x$ columns reactively coupled to this row, whereas a 0-output signal appears at the outputs of the remaining $x$ columns which are not reactively coupled to the above particular row. However, the actual 0-output signal is not a signal having a 0-amplitude but a signal having an amplitude $y$, situated between the above 0- and 1-amplitudes. This increase of the amplitude of the 0-output signal from the 0-level to the $y$-level is due to the existence of residual and internal couplings in the above two-coordinate arrangement. For a similar reason the actual 1-output signal has an amplitude $z$ which is smaller than the normal 1-amplitude. Hence the 0- to 1-output signal ratio increases from zero towards the unity so that the discrimination of the 0- and 1-output signals may become difficult. It is easy to understand that this difficulty increases when the size of the two co-ordinate arrangement is increased, the above 0- to 1-output signal ratio tending then to the unity, and the discrimination of the 0- and 1-output signals becoming then more and more difficult and involving complicated output circuits.

It is therefore an object of the present invention to provide a read-only memory system of the above type but in which the 0- to 1-output signal ratio is constant and of small value and is independent from the number of rows, columns, reactive cross-point couplings and input and output impedances of the two co-ordinate arrangement.

The present read-only memory system is characterized by the fact that the waveform of said input or interrogation signal varies linearly during the interrogation time.

The above mentioned and other objects and features of the invention will become more apparent and the invention itself will be best understood by referring to the following description of an embodiment taken in conjunction with the accompanying drawings wherein.

Figure 1:
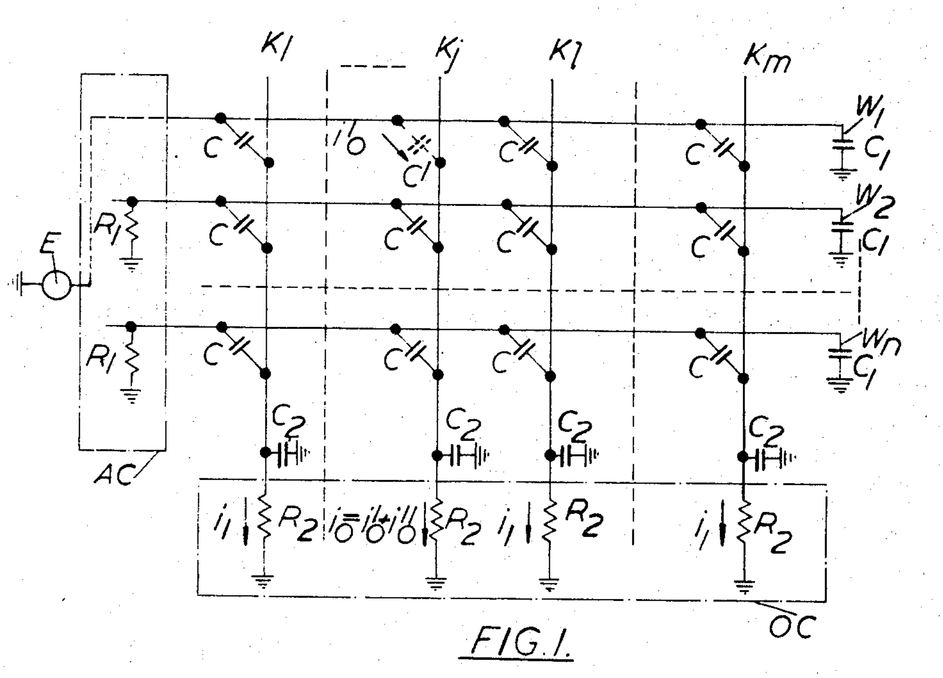
FIG. 1 represents an electrical configuration of a read-only memory system including a two-coordinate arrangement of capacitive cross-point couplings in which an interrogation signal is applied to a row or input conductor.

Principally referring to FIG. 1, the capacitive matrix-memory shown therein has $m$ columns identified by the references $K_1$, $K_j$, $K_l$ . . . $K_m$ and $n$ rows identified by the references $W_1$, $W_2$ . . . $W_n$.

The most adverse case is considered: at each cross-point of this matrix there is provided a capacitive or a 1-coupling through a capacitor C, except at the cross-point of the row $W_1$ and the column $K_j$ where no real coupling is provided but only a residual one which is represented by the residual capacity $C'$ between the column wire $K_j$ and the row wire $W_1$.

The capacitors $C_1$ and $C_2$ stand for the row wire-to-ground and column wire-to-ground capacities respectively. The grounded resistors $R_2$ in the column wires $K_1$, $K_m$, represent the input impedances of the column or output signal amplifiers e.g. grounded base transistors, which form part of the output circuits indicated by the block OC, whereas the grounded resistors $R_1$ in the non-interrogated rows $W_2$ . . . $W_n$ represent the impedances seen by these rows.

The resistors $R_1$ form part of gating circuits of the input or access circuit, indicated by the block AC and described in the previously mentioned French Patent 1,245,808. The row $W_1$ is an interrogated row and E represents a voltage generator, generating a linearly increasing voltage or ramp voltage E which constitutes the interrogation or input signal applied thereto through the gating circuits of AC and which is equal to $v.t.$ $v$ being a constant voltage slope and $t$ being the time variable. In response to this input signal E, an output current $i_1$ flows to ground through the input resistance $R_2$ of each column amplifier, except through the input resistance $R_2$ of the column amplifier of the column $K_j$, through which a current $i_0$ different from $i_1$ flows. The currents $i_1$ and $i_0$ correspond to a 1-output and a 0-output signal respectively. The output current $i_0$ is composed of the sum of two currents $i'_0$ and $i''_0$, $i'_0$ being the current determined by the residual or leakage capacity $C'$ and $i''_0$ being the current determined by the coupling of the column $K_j$ with all the other columns through the cross-point capacitors C. Hereinafter the 1-output current $i_1$ will be calculated in order to make clear the effects resulting from the use of the above mentioned linearly increasing interrogation signal E.

Figure 2:
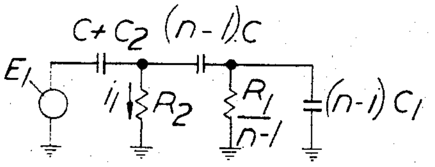
FIGS. 2, 3 and 4 show equivalent electrical circuits of a particular column circuit of the two co-ordinate arrangement of FIG. 1, assuming all other columns removed.
Figure 3:
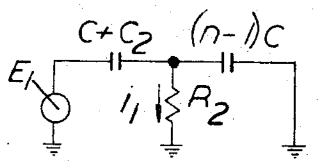

Referring to FIG. 2 the circuit represented therein is an equivalent circuit of the column $K_1$ of the arrangement of FIG. 1 in which all the columns except the column $K_1$ considered are removed. The cross-point capacity C between row $W_1$ and column $K_1$ has been combined with the capacity $C_2$ of the column wire $K_1$ to ground, into a single capacity $C+C_2$. The interrogation voltage signal $E=vt$ is therefore substituted by $$E_1=v\frac{C}{C+C_2}t$$

and it is assumed that this signal $E_1$ is generated by an equivalent voltage generator $E_1$. The other constituent elements of this figure and their values may easily be found from FIG. 1. Referring to the circuit of FIG. 3, this circuit is obtained from the circuit of FIG. 2 by remarking that in practice the capacity $C_1$ is much larger than the capacity C and hence one can neglect the voltage drop across $(n-1)\ C_1$ against that across $(n-1)$ C. Referring to the circuit of FIG. 4, this circuit is obtained from the circuit of FIG. 3 by combining the capacities $C+C_2$ and $(n-1C)$ into a single capacity $C_2+nC$. The voltage generator $E_1$ is therefore substituted by an equivalent voltage generator $E_2$ which generates a voltage signal $$E_2=v\cdot\frac{C}{C2+nC}t$$

Figure 4:
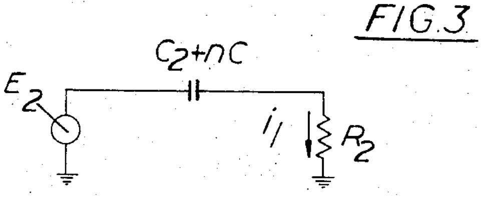

From the circuit of FIG. 4 the following first order differential equation may easily be obtained:

$$\frac{di_1}{dt}+i_1\frac{1}{R_2(C_2+nC)}=\frac{Cv}{(C_2+nC)R_2} \quad (1)$$

Solving the above Equation 1, it is found:

$$i_1=vC\left(1-e^{\frac{t}{T}}\right) \quad (2)$$

with $$T=R_2\ (C_2+nC) \quad (3)$$

and it is seen that the current $i_1$ available at the input of the column amplifier is an increasing current which, after a sufficiently long time interval, e.g. $t \geqslant 3T$, substantially reaches the asymptotic value $v$C. This asymptotic value is the value of the current injected in the column wide $K_1$ by the ramp voltage $E=vt$ and is independent of the store size, the input impedance $R_2$ of the column amplifier and the impedance $R_1$ of the non interrogated rows. However, the time factor T increases when increasing the number of rows $n$ so that the time interval after which the current $i_1$ reaches the asymptotic value $v$C, also increases. The curve showing the variation of the current $i_1$ (in micro amperes) in function of time $t$ (in microseconds) has been traced in FIG. 8, for a capacitive memory having the following element values:

$R_2=10\Omega$
$R_1=10^4\Omega$
$n=5{,}000$
$m=60$
$C=3\times10^{-12}F$
$C_1=90\times10^{-12}F$
$C_2=8{,}750\times10^{-12}F$
$v=6.6\times10^6$ v./sec.

For this memory 95% of the asymptotic value $vC=19$. $vC=19.8\mu$A. is attained after a time interval $3T=.7125\mu$ sec. It is to be noted that the value of T given by the relation (3) is a maximum value, since it has been assumed that in all the cross-points of the column $K_1$ there is a capacitive coupling C, the capacity C being in practice larger than the residual capacity C′.

Hereinafter the 0-output current $i_0$ will be calculated in order to make clear the effects resulting from the use of the above mentioned linearly increasing interrogation signal E.

Figure 5:
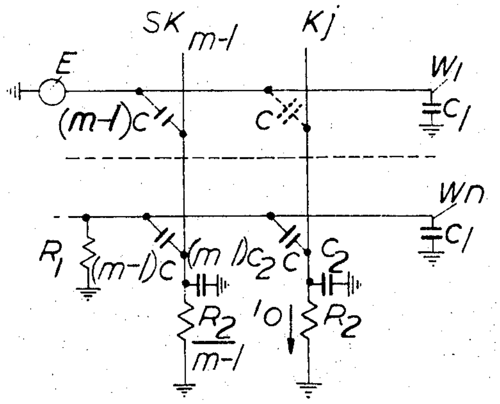
FIGS. 5, 6 and 7 represent equivalent electrical circuits of the configuration of FIG. 1.
Figure 6:
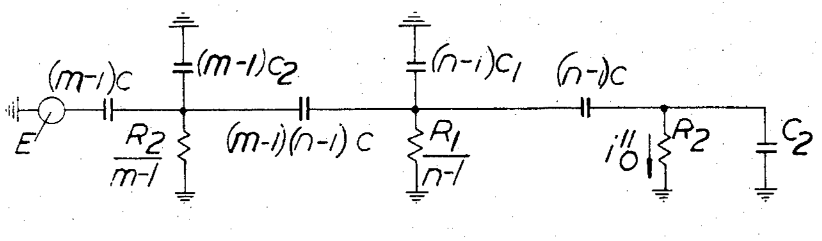
Figure 7:
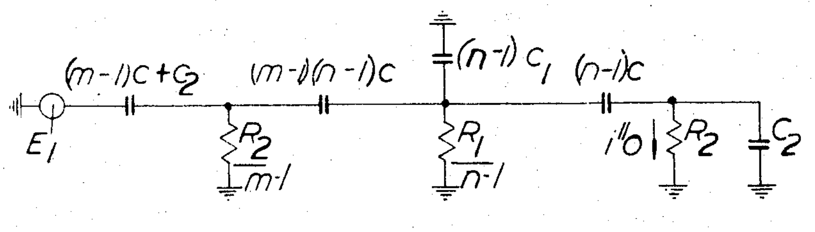

Referring to FIG. 5 the circuit shown therein is obtained from the configuration of FIG. 1 by combining, the column $K_j$ being excepted, the remaining $m$-1 columns into a single one indicated by $SKm$-1. Referring to the circuit of FIG. 6 this circuit is obtained from the circuit of FIG. 5 by combining the elements of the ($n$-1) non interrogated rows, the leakage capacity C′ having been disregarded with respect to the capacity $(n-1)$ C. Referring to the circuit of FIG. 7 this circuit is obtained from that of FIG. 6 by the simple combination of the capacities $(m-1)C$ and $(m-1)C_2$ into a single capacity $(m-1)$. $(C+C_2)$. The voltage signal $E=vt$ has been replaced by $$E_1=v\frac{C}{C+C_2}t$$

in order to take into account this combination of capacities.

Reference being made now to FIGS. 1, 5, 6, 7 and especially to FIG. 1, as already mentioned above, the current $i_0$ flowing to the column amplifier of the column $K_j$ is the sum of two currents $i'_0$ and $i''_0$, the current $i'_0$ being due to the residual or leakage cross-point capacitive coupling C′ and the current $i''_0$ being due to the internal capacitive couplings of the column $K_j$ with all the other columns.

The current $i'_0$ may be calculated in the same way as the current $i_1$ by considering the column $K_j$ and it results therefrom that the current $i'_0$ attains the asymptotic value $$i'_0=vC' \quad (4)$$

after a time interval $t \geqslant 3T_1$ with $$T_1=R_2[C_2+C'+(n-1)C] \quad (5)$$

It is to be noted that the value of the time constant T, given by the Equation 3, is larger than the value of the time constant $T_1$, since the capacity C is larger than the capacity C′; hence, after a time interval $t \geqslant 3T$ both currents $i_0$ and $i'_0$ have reached their asymptotic values $v$C and $v$C′, respectively. The value of the current $i''_0$ may be computed from the equivalent circuit of FIG. 7 and it is found:

$$i''_0=\frac{v'C_3C_4C_5[p_1(p_3-p_2)e^{p_1t}+p_2(p_1-p_3)e^{p_2t}+p_3(p_2-p_1)e^{p_3t}]}{R_2(C_3C_4+C_3C_5+C_4C_5)(C_6+C_2)[p_2p_3(p_3-p_2)+p_1p_3(p_3-p_3)p_1p_2(p_2-p_1)]} \quad (6)$$

where:

$$v'=v\cdot\frac{C}{C+C_2} \quad (7)$$

$$C_3=(m-1)(C+C_2) \quad (8)$$

$$C_4=(m-1)(n-1)C \quad (9)$$

$$C_5=(n-1)C_1 \quad (10)$$

$$C_6=(n-1)C \quad (11)$$

$$R_3=\frac{R_2}{m-1} \quad (12)$$

$$R_4=\frac{R_1}{n-1} \quad (13)$$

$$P_1=\frac{-1}{R_2(C_6+C_2)} \quad (14)$$

$$P_2=\frac{-R_4(C_4+C_5)-R_3(C+C_4)+\sqrt{[R_4(C_4+C_5)+R_3(C_3+C_4)]^2-4R_3R_4(C_3C_4+C_3C_5+C_4C_5)}}{2R_3R_4(C_3C_4+C_3C_5+C_4C_5)} \quad (15)$$

$$P_3=\frac{-R_4(C_4+C_5)-R_3(C_3+C_4)-\sqrt{[R_4(C_4+C_5)+R_3(C_3+C_4)]^2-4R_3R_4(C_3C_4+C_3C_5+C_4C_5)}}{2R_3R_4(C_3C_4+C_3C_5+C_4C_5)} \quad (16)$$

Considering again the capacitive memory having the previously mentioned element values, the relation (5) applied thereto becomes:

$$i''_0=0.637\left(30.1^{-\frac{t}{0.2375}}-1.2e^{-\frac{t}{2.77}}-28.9e^{-\frac{t}{0.133}}\right) \quad (6')$$

Figure 8:
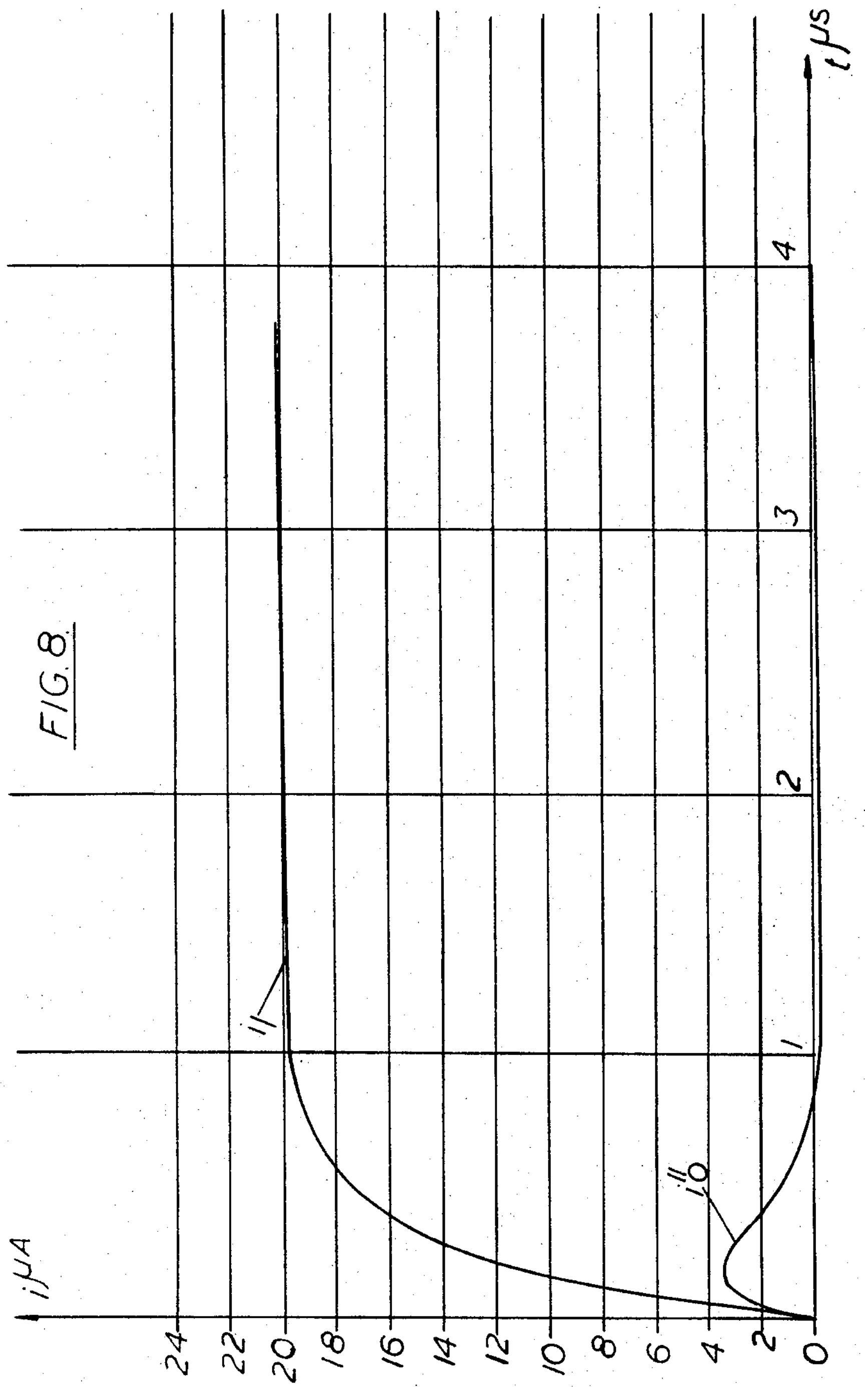
FIG. 8 is a two co-ordinate diagram showing two current variations in a read-only memory system having particular element values.

The curve showing the variation of this current $i''_0$ has also been traced in FIG. 8 and it may be seen that after 0.8/$\mu$sec. the polarity of the current $i''_0$ is reversed, and is then negligible and obviously has a favourable effect on the discrimination of the 1- and 0-output signals. Thus, if the read-out operation of the above capacitive memory is performed, e.g. 1 microsecond after the ramp voltage interrogation signal has been applied, the 0- to 1-output signal ratio is constant and of small value so that the discrimination of the output signals by the output circuits may be made in a safe manner. Also it is to be remarked that it is no longer essential to have low impedance rows and columns since these impedances only affect the time factor $T=R_2(C_2+nC)$ and hence only the reading speed, lower impedances permitting higher reading speeds. These impedances are now calculated for satisfying only to the involved reading speed, higher row and column impedances simplying in general the access and read out equipment.

From the above discussion it results that an increase of the system reliability as well as a reduction of the cost of the access and read out equipment can be obtained due to the ramp voltage waveform of the interrogation signal.

It is also to be noted, the duality between the capacitive and inductive stores being well known, that the advantages offered by using a ramp voltage signal for interrogating a capacitive store are also valid for an inductive store when interrogating it with a ramp current signal.

Also, although the invention has been described in relation to coupling immittances which are directly proportional to frequency, this in association with input signals with amplitudes varying linearly with time, other types of immittances as well as other shapes for the reading waveform may be envisaged.

While the principles of the invention have been described above in connection with specific apparatus, it is to be clearly understood that this description is made only by way of example and not as a limitation on the scope of the invention.

We claim:

1. Read-only memory system including, a two coordinate arrangement of cross-point coupling impedances of two or more distinct values, each established between a particular pair of electrical conductors, one conductor out of a first set of $n$ conductors and the other conductor out of a second set of $m$ conductors, interrogation means via which an interrogation signal may be applied to an electrical conductor out of said first set of $n$ conductors and output or reading means coupled to said electrical conductors of said second set of $m$ conductors, said interrogation signal generating at least two distinct output signals, e.g. a one or a zero output signal, in accordance with the value of said coupling impedance, in each conductor of said second set of $m$ conductors, and said output means detecting or reading the output signals generated in the conductors of said second set, characterized in this, that said interrogation signal is such a linearly increasing predetermined function of time that after a predetermined time interval from the moment it is applied to said conductor of said first set of $n$ conductors, said distinct output signals generated in the $m$ conductors of said second set reach substantially constant and distinct values, the cross-point coupling impedance values of the $n$–1 non-interrogated conductors of said first set with the $m$ conductors of said second set becoming then infinite and without effect on said first and second values of said output signals whereby said constant and distinct values are independent of $m$ and $n$ and that said memory system further includes enabling means which enable said output means to detect or to read said output signals only during a reading time interval which follows said predetermined time interval.

2. Read-only memory system as claimed in claim 1, characterized in this, that said interrogation signal is a predetermined function of time only up to the end of said reading time interval.

3. Read-only memory system as claimed in claim 1 characterized in this, that said cross-point coupling impedances consist of frequency dependent impedances.

4. Read-only memory system as claimed in claim 3, characterized in this, that said cross-point coupling impedances consist of reactive impedances.

5. Read-only memory system as claimed in claim 4, characterized in this, that said reactive impedances are purely capacitive, and that said interrogation signal is a voltage signal of which said predetermined function of time is linear.

6. Read-only memory system as claimed in claim 4, characterized in this, that said reactive impedances are purely inductive, and that said interrogation signal is a current signal of which said predetermined function of time is linear.

No references cited.

TERRELL W. FEARS, *Primary Examiner.*

U.S. Cl. X.R.

340—166